No. 648,305. Patented Apr. 24, 1900.
E. S. SAUNDERS & J. A. RODMAN.
CAR FENDER.
(Application filed Sept. 26, 1899.)
(No Model.)
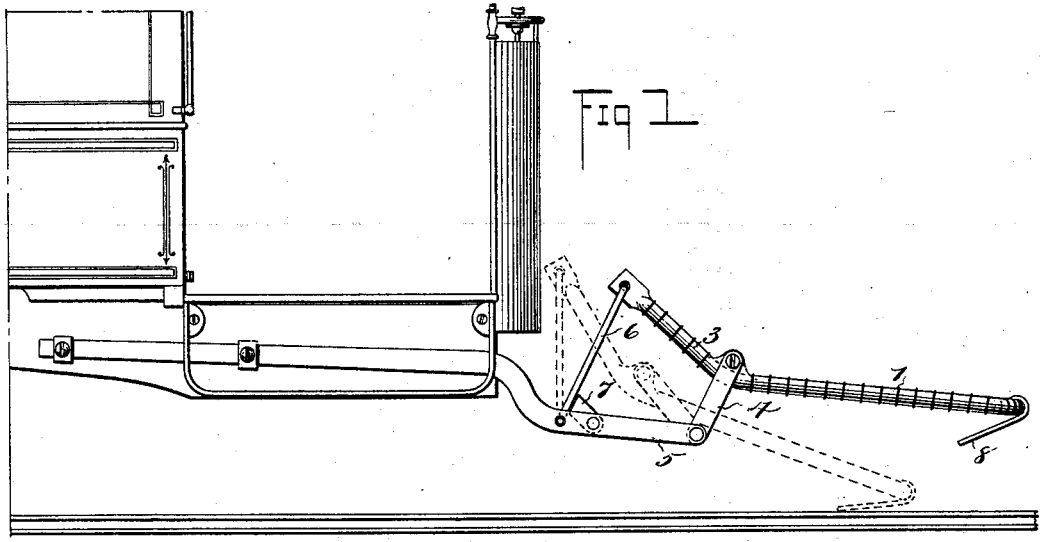
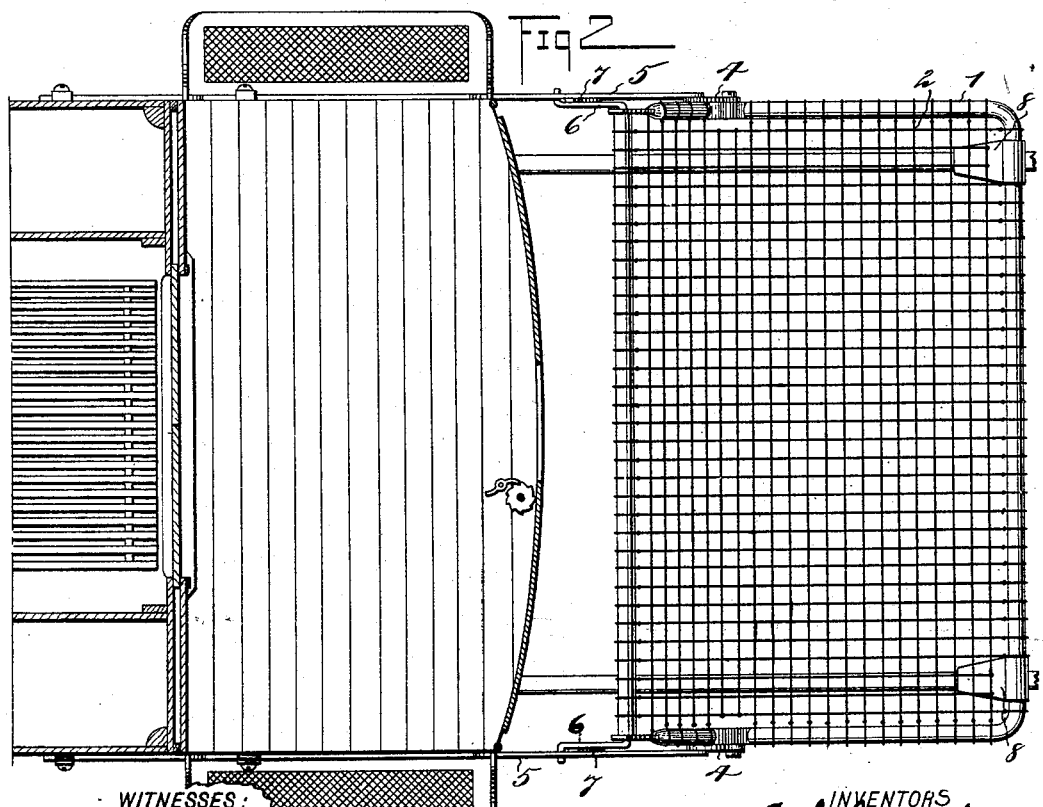
WITNESSES
INVENTORS
E. S. Saunders
BY J. A. Rodman
ATTORNEYS

United States Patent Office.

EBEN SHILLIBER SAUNDERS AND JAMES A. RODMAN, OF OLATHE, KANSAS.

CAR-FENDER.

SPECIFICATION forming part of Letters Patent No. 648,305, dated April 24, 1900.

Application filed September 26, 1899. Serial No. 731,704. (No model.)

*To all whom it may concern:*

Be it known that we, EBEN SHILLIBER SAUNDERS and JAMES A. RODMAN, of Olathe, in the county of Johnson and State of Kansas, have invented a new and Improved Car-Fender, of which the following is a full, clear, and exact description.

This invention relates to improvements in fenders for street-cars; and the object is to provide a fender so arranged that under ordinary or usual circumstances the front portion will be at a suitable elevation above the trackway, but which upon striking an obstruction or person will be caused to lower, so that the front portion will come close to the track-bed, and thus pick up the obstruction or person without danger of running over the same.

We will describe a fender embodying our invention and then point out the novel features in the appended claims.

Reference is to be had to the accompanying drawings, forming a part of this specification, in which similar characters of reference indicate corresponding parts in both views.

Figure 1 is a side elevation of a car-fender embodying our invention, and Fig. 2 is a plan view thereof, both views showing the fender as attached to a car.

The fender comprises a frame 1 of suitable material—such, for instance, as tubing—and attached to the frame is a netting 2. The rear portion 3 of the frame is inclined upward and rearward, and pivotally connected to the frame at the junction of this upwardly-inclined portion and the forward portion are links 4, to the lower ends of which are pivoted bars 5, extended forward from the car-platform, and from the upper end of the upwardly-extended portion 3 links 6 extend downward and have pivotal connection with the bars 5. When the fender is in its normal position, as indicated in Fig. 1, the several links will be inclined upward and forward from their lower pivotal point and will be supported in this position by means of stops 7, attached to the bars 5 and with which the links 6 engage. Should the front of the fender come in contact with a person or other obstruction, it will be forced rearward and downward, as indicated in dotted lines in Fig. 1, so that the front portion or shoes 8 thereon will engage with the track-bed and slide along the same. It is obvious that when in this position a person or other obstruction struck will be picked up by the fender or thrown to one side, thus preventing the car from running over the same.

Having thus described our invention, we claim as new and desire to secure by Letters Patent—

1. In a fender, supporting-bars adapted to be attached to a car, a fender, links connected to the forward ends of said supporting-bars and also to the side portions of the fender-frame, links connecting said supporting-bars with the rear portion of the fender-frame, and stops for engaging with the last-named links supporting said links at an upward and forward inclination, substantially as specified.

2. The combination with a car, of supporting-bars extended forward therefrom, a fender, links connected to the forward ends of said supporting-bars and also to the side bars of the fender-frame, and links connecting said supporting-bars with the rear portion of the frame, all of said links normally standing at an upward and forward inclination, substantially as specified.

EBEN SHILLIBER SAUNDERS.
JAMES A. RODMAN.

Witnesses:
BERT GIBSON,
JAMES R. ORR.